(12) United States Patent
Connor et al.

(10) Patent No.: US 7,685,250 B2
(45) Date of Patent: Mar. 23, 2010

(54) TECHNIQUES FOR PROVIDING PACKET RATE PACING

(75) Inventors: Patrick L. Connor, Portland, OR (US); Scott P. Dubal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1377 days.

(21) Appl. No.: 11/076,750

(22) Filed: Mar. 9, 2005

(65) Prior Publication Data

US 2006/0206579 A1 Sep. 14, 2006

(51) Int. Cl.
*G06F 15/16* (2006.01)

(52) U.S. Cl. .................. 709/214; 709/233; 709/234; 709/235

(58) Field of Classification Search .............. 709/233, 709/234, 235, 214, 33
See application file for complete search history.

(56) References Cited

U.S. PATENT DOCUMENTS

| | | | | |
|---|---|---|---|---|
| 6,067,301 A | * | 5/2000 | Aatresh | 370/418 |
| 6,081,507 A | * | 6/2000 | Chao et al. | 370/235 |
| 7,190,667 B2 | * | 3/2007 | Susnow et al. | 370/229 |
| 7,254,138 B2 | * | 8/2007 | Sandstrom | 370/412 |
| 7,418,732 B2 | * | 8/2008 | Campbell et al. | 726/23 |
| 2002/0131419 A1 | * | 9/2002 | Tamai | 370/395.4 |
| 2003/0128664 A1 | | 7/2003 | Connor | |
| 2003/0156542 A1 | | 8/2003 | Connor | |

OTHER PUBLICATIONS

Information Sciences Institute, *Transmission Control Protocol: DARPA Internet Program Protocol Specification*, Document No. RFC 793, 91 pages, Sep. 1981.
Blanton, E. et al., *A Conservative Selective Acknowledgment (SACK)-based Loss Recover Algorithm for TCP*, Network Working Group, Document No. RFC 3517, 13 pages, Apr. 2003.
Floyd, S. et al., *An Extension to the Selective Acknowledgment (SACK) Option for TCP*, Network Working Group, Document No. RFC 2883, 17 pages, Apr. 2000.
Allman, M. et al., *TCP Congestion Control*, Network Working Group, Document No. RFC 2581, 14 pages, Apr. 1999.
Mathis, M. et al., *TCP Selective Acknowledgment Options*, Network Working Group, Document No. RFC 2018, 12 pages, Oct. 1996.
IEEE, *Specification for 802.3 Full Duplex Operation and Physical Layer Specification for 100 Mb/s Operation on Two Pairs of Category 3 or Better Balanced Twisted Pair Cable (100BASE-T2)*, IEEE Standard 802.3x-1997 and IEEE Standard 802.3y-1997 (Supplement to ISO/IEC 8802-3, 1996; ANSI/IEEE Standard 802.3, 1996 Edition), pp. 313-322, 1997.
IEEE, *Information Technology—Telecommunications and Information Exchange Between Systems—Local and Metropolitan Area Networks—Common Specifications—Part 3: Media Access Control (MAC) Bridges*, IEEE Standard P802.1D/D17, 378 pages, 1998.

* cited by examiner

*Primary Examiner*—Vivek Srivastava
*Assistant Examiner*—Adnan Mirza
(74) *Attorney, Agent, or Firm*—Caven & Aghevli LLC

(57) ABSTRACT

Techniques to pace the transmission of packets to multiple connections using one or more queues or storages. When multiple queues are used, each queue may have an associated throughput rate and each of the queues may have a different associated throughput rate.

23 Claims, 8 Drawing Sheets

TECHNIQUES FOR PROVIDING PACKET RATE PACING

FIELD

The subject matter disclosed herein relates to techniques for controlling rates at which packets are transmitted to a network.

RELATED ART

The use of local area networks (LANs) has grown significantly. Server speed transmission rates have increased whereas client receive rate capabilities have remained relatively constant, thereby creating a large disparity in the link speeds between servers and clients.

The Transmission Control Protocol over Internet Protocol (TCP/IP) is a popular protocol used to transmit packets between a server and clients. The sliding window technique in TCP often results in packets being sent in spurts (known as packet trains) with minimal inter-frame spacing. FIG. 1 depicts an example whereby a server transmits packet trains A, B, and C to a switch for transmission to respective clients A, B, and C. For example, client A may be a mobile client with a relatively slow connection speed (e.g., 11 megabit/second), Client B may be a computer with a faster connection speed (e.g., 100 megabit/second), and Client C may be a computer with a 1 gigabit/second connection speed. When packet trains pass through ingress and egress ports of the switch at similar link speeds there are generally no problems. For example, most modern switches support a cut-through mode, in which after only partial buffering at the switch, a packet will be forwarded on to its destination.

If the ingress link speed to the switch is higher than the egress speed, such as the typical case of a server sending data to a client, then nearly the entire packet train of any train might be buffered at the switch. In most switches, any packet that needs to be stored (for a store and forward operation) may be placed in a shared memory and accordingly, buffering is generally accomplished using a shared memory within the switch. This results in even moderate loads of disparate speeds causing significant use of packet storage capabilities of the switch and can result in congestion and packet loss at the switch.

Under TCP, packet loss in a TCP connection results in retransmissions and TCP congestion control. TCP congestion control can involve reducing the size of transmitted data blocks at any one time. Accordingly link speed disparity may result in network congestion, packet loss, and retransmission which reduces the server and network transmission efficiency. The scheme TCP uses to cope with this disparity reduces the server efficiency by reducing the size of transmitted data blocks at any one time. dr

BRIEF DESCRIPTION OF THE DRAWINGS

Note that use of the same reference numbers in different figures indicates the same or like elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1:
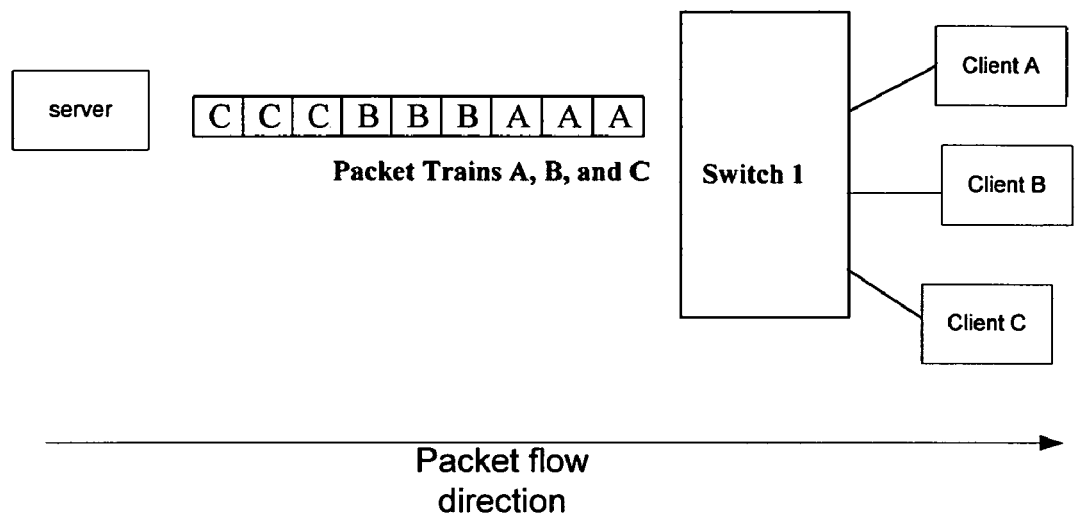
FIG. 1 depicts an example manner by which packets are transmitted to multiple connection partners.
Figure 2:
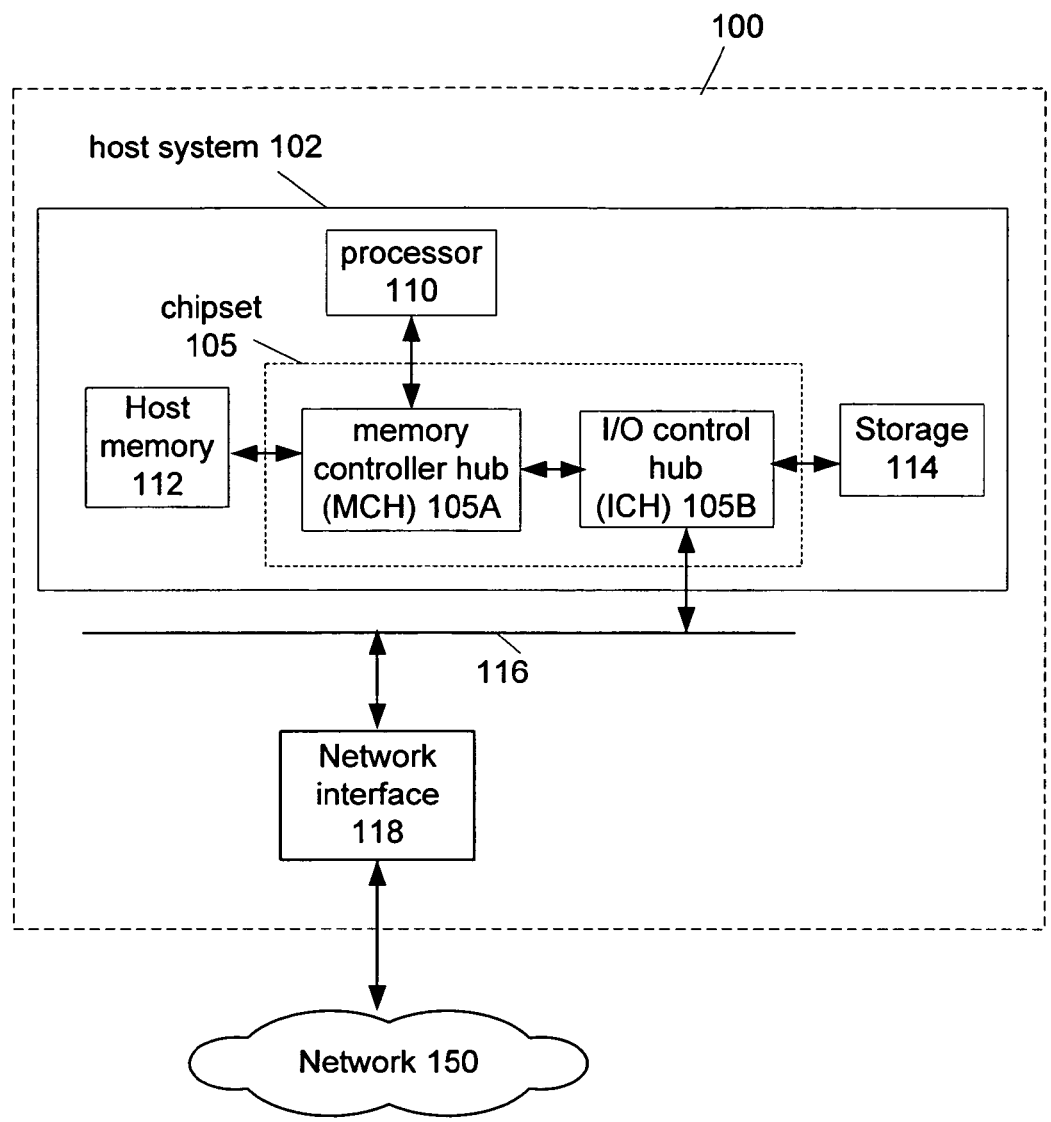
FIG. 2 depicts an example computer system that can use embodiments of the present invention.

FIG. 2 depicts in computer system 100 a suitable system in which some embodiments of the present invention may be used. Computer system 100 may include host system 102, bus 116, and network interface 118.

Host system 102 may include chipset 105, processor 110, host memory 112, and storage 114. Chipset 105 may include a memory controller hub (MCH) 105A that may provide intercommunication among processor 110 and host memory 112 as well as a graphics adapter that can be used for transmission of graphics and information for display on a display device (both not depicted). Chipset 105 may further include an I/O control hub (ICH) 105B that may provide intercommunication among MCH 105A, storage 114, and bus 116. For example, chipset 105 may include a storage adapter (not depicted) capable of providing intercommunication with storage 114. For example, the storage adapter may be capable of communicating with storage 114 in conformance with any of the following protocols: Small Computer Systems Interface (SCSI), Fibre Channel (FC), and/or Serial Advanced Technology Attachment (S-ATA).

Processor 110 may be implemented as Complex Instruction Set Computer (CISC) or Reduced Instruction Set Computer (RISC) processors, multi-core, or any other microprocessor or central processing unit.

Host memory 112 may be implemented as a volatile memory device such as but not limited to a Random Access Memory (RAM), Dynamic Random Access Memory (DRAM), or Static RAM (SRAM).

Storage 114 may be implemented as a non-volatile storage device such as but not limited to a magnetic disk drive, optical disk drive, tape drive, an internal storage device, an attached storage device, and/or a network accessible storage device.

Bus 116 may provide intercommunication among at least host system 102 and network interface 118. Bus 116 may support serial or parallel communications. Bus 116 may support node-to-node or node-to-multi-node communications. Bus 116 may be compatible with Peripheral Component Interconnect (PCI) described for example at Peripheral Component Interconnect (PCI) Local Bus Specification, Revision 2.2, Dec. 18, 1998 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.0a, Jul. 24, 2000, available from the aforesaid PCI Special Interest Group, Portland, Oreg., U.S.A. (as well as revisions thereof); and/or Universal Serial Bus (USB) (and related standards) as well as other interconnection standards.

Network interface 118 may be capable of providing intercommunication between host system 102 and network 150 in compliance with protocols supported by network 150. Network interface 118 may intercommunicate with host system 102 using bus 116. In one embodiment, network interface 118 may be integrated into ICH 105B or into chipset 105. When host system 102 is a server computer, network interface 118 may be implemented as part of an enterprise south bridge (ESB) (or its equivalent) portion of the server's chipset (not depicted).

In accordance with an embodiment of the present invention, network interface 118 may provide one or more queues and/or storages capable of storing packets and network interface 118 may be capable of pacing the transmission of packets to one or more connection partners.

Network 150 may be any network such as the Internet, an intranet, a local area network (LAN), storage area network (SAN), a wide area network (WAN), or wireless network. Network 150 may exchange traffic with network interface 118 using the Ethernet standard (described in IEEE 802.3 and related standards) or any communications standard.

Computer system 100 may be implemented as any or a combination of: microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Figure 3A:
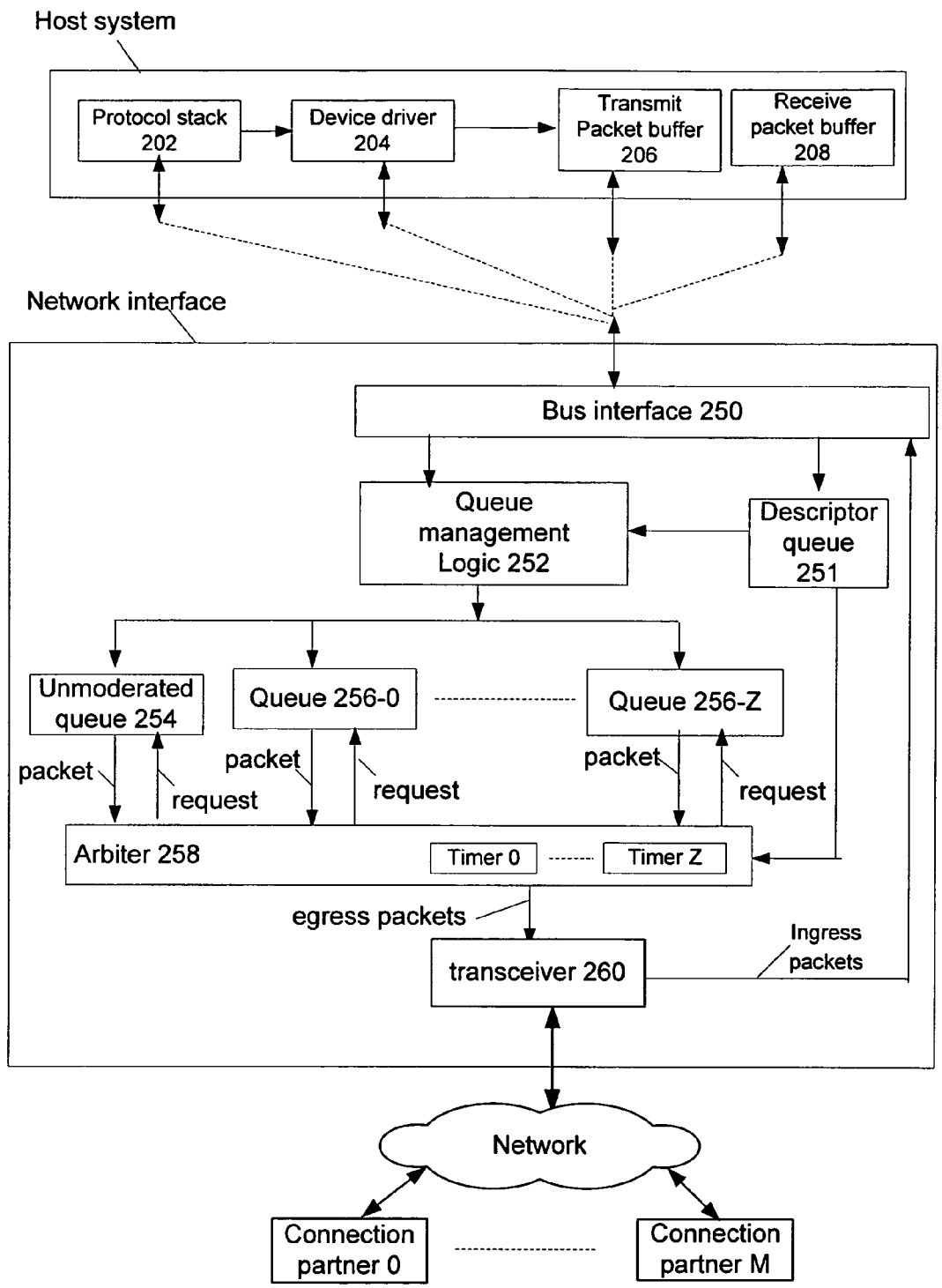
FIGS. 3A-3C depict example embodiments of the present invention.

FIG. 3A depicts an example embodiment of the present invention that can be used to transmit packets at a variety of transmission speeds from a host computer to any of connection partners 0 to M (where $M \geq 1$) using a network interface. In a host system, FIG. 3A depicts use of protocol stack 202, device driver 204, transmit packet buffer 206, and receive packet buffer 208. FIG. 3A also depicts use of a network interface that includes at least bus interface 250, descriptor queue 251, queue management logic 252, unmoderated queue 254, queues 256-0 to 256-Z (where $Z \geq 1$), arbiter 258, and transceiver 260.

For example, protocol stack 202 and device driver 204 may be executed using a processor such as but not limited to processor 110. Protocol stack 202 may at least generate protocol related information for packets and initiate the transfer of packets from transmit packet buffer 206 to the network interface for transmission to a network. Protocol stack 202 may at least process packets received from a network to determine protocol compliance. For example, protocol stack 202 may provide and determine protocol compliance in accordance with relevant TCP/IP standards however other protocols may be supported such as but not limited to Net-BEUI and IPX/SPX. The TCP/IP protocol is described in the publication entitled "Transmission Control Protocol: DARPA Internet Program Protocol Specification," prepared for the Defense Advanced Projects Research Agency (RFC 793, published September 1981). In one embodiment, protocol stack 202 may be incorporated into an operating system. For example, the operating system may be compatible with Microsoft Windows® and/or Linux®.

Device driver 204 may be a device driver for the network interface. For example, device driver 204 may manage the creation and allocation of descriptors at least for use in transferring packets between the host system and the network interface. For example, device driver 204 may initiate the transfer of packets to network interface as well as the processing of packets received from network interface.

In one embodiment, protocol stack 202 and/or device driver 204 may determine inter-packet spacing for packets in each connection (each connection is also called a "flow") between the host system and a connection partner in accordance at least with IEEE 802.3 and related standards. A "connection" may include a sender and destination connection partner to receive packets from the sender through any number or configuration of link partners.

For example, inter-packet spacing for packets in a connection can be determined by considering factors such as (1) congestion window size, (2) receiver window size, (3) acknowledgements in a TCP/IP header in packets received from the network, (4) pattern(s) of acknowledgments, and (5) round-trip time. For example, (1) congestion window size may be a-TCP state variable that limits the amount of data that can be sent at any time. For example, RFC 2581 ("TCP Congestion Control" (1999)) describes suitable techniques to determine a congestion window size. For example, (2) receiver window size may provide an indication of how many bytes the connection partner can currently accept at the time the packet with the receiver window size was generated. Receiver window size may be provided in a header of TCP/IP header with an acknowledgment from a connection partner. For example, the TCP/IP protocol describes suitable techniques to determine a receiver window size. For example, (3) acknowledgements in TCP/IP headers in packets received from a connection partner may include a selective acknowledgement which indicates packet drops option used. Selective acknowledgements are described for example in RFC 2018 ("TCP Selective Acknowledgement Options" (1996)), RFC 2883 ("An Extension to the Selective Acknowledgement (SACK) Option for TCP" (2000)), and RFC 3517 ("A Conservative Selective Acknowledgment (SACK)-based Loss Recovery Algorithm for TCP" (2003). For example, (4) pattern of acknowledgments in standard TCP/IP packet headers received from the network may show packet loss by a connection partner. For example, (5) round-trip time may be a calculation by a TCP stack to determine how long acknowledgment took to receive.

For example, inter-packet spacing for a connection can be determined from the lowest link speed in a connection route. For example, where a connection route includes multiple links between source and connection partner, the lowest link speed may be the slowest link speed between two links in the connection route. For example, the Simple Network Management Protocol (SNMP) protocol may be used to determine the lowest link speed for each link in a connection route.

Inter-packet spacing may be re-calculated periodically or when a material change occurs in the parameters used to determine the inter-packet spacing.

Transmit packet buffer 206 may store packets prior to transfer to the network interface for transmission to a network. Receive packet buffer 208 may store packets received from a network and transferred through network interface to the host system. For example, receive packet buffer 208 may store packets sent from a connection partner indicating acknowledgements in a TCP/IP packet headers. For example, transmit packet buffer 206 and receive packet buffer 208 may be stored in a memory such as but not limited to host memory 112.

Referring next to the network interface portion of FIG. 3A, bus interface 250 may provide intercommunication with a bus (such bus may include but is not limited to a bus similar to bus 116 (FIG. 2)). For example, the bus may provide intercommunication between the network interface and the host system. Bus interface 250 may comply with standards supported by the bus (although other interconnection standards may be used). For example, bus interface 250 may include and utilize a direct memory access (DMA) engine (not depicted) to perform direct memory accesses of information from and into host memory and/or host storage of a host system. For example, bus interface 250 may receive at least packets and descriptors from the host system.

Descriptor queue 251 can be used to transfer descriptors from the host system to the network interface. Descriptor queue 251 can be used to receive descriptors associated with each packet and specify at least a location of the packet in a transmit packet buffer as well as an inter-packet spacing for the packet.

Queue management logic 252 may decide which queue among queues 256-0 to 256-Z as well as unmoderated queue 254 is to store a packet based at least on associated inter-packet spacing. Inter-packet spacing for each packet may be transferred to queue management logic 252 from a host using a descriptor associated with each packet. For example, queue management logic 252 may utilize a look-up-table (LUT) to store associations between queues among queues 256-0 to 256-Z and inter-packet spacings. For example, one or more queues may be allocated for each inter-packet spacing. For example, if an inter-packet spacing of a packet has an associated queue, then such packet may be transferred to such associated queue. For example, if none of queues 256-0 to 256-Z is allocated for an inter-packet spacing for a packet, the packet may be allocated for a queue with a higher throughput or packet rate (i.e., lower inter-packet spacing) or into the unmoderated queue 254. The term "throughput" can be used to refer to data transfer rate or packet transfer rate. A throughput rate may be a fraction of the link speed, which establishes the upper transmission rate limit to a link partner. For example, a link partner may be a next node which receives traffic from the network interface. A throughput rate for a queue may be inversely proportional to an inter-packet spacing of packets transmitted from the queue. For example, a packet may be transferred to the unmoderated queue 254 at least when the packet has no associated inter-packet spacing or the queue the packet is to be transferred to is full or incapable of receiving the packet.

Unmoderated queue 254 may be capable of storing packets. For example, packets stored in unmoderated queue 254 may have no associated inter-packet spacing or the queue the packet is to be transferred to is full or incapable of receiving the packet. For example, no inter-packet spacing may be provided for non-TCP/IP protocol compliant traffic such as, but not limited to, NetBEUI or IPX/SPX compliant traffic.

Queues 256-0 to 256-Z may be capable of storing packets to be transmitted at specific throughput rates. For example, each queue among queues 256-0 to 256-Z may store packets to be transmitted at the same throughput rate or a similar throughput rate but to different connection partners. For example, queue 256-0 may be associated with packets to be transmitted at a specified throughput rate but to one or more connection partners whereas queue 256-Z may be associated with packets to be transmitted at a specified throughput rate less than that of queue 256-0 and also to one or more connection partners. Queues may be added or removed. Packets may be released from each queue in a first-in-first-out manner and in response to a request from arbiter 258.

At initialization, each of queues 256-0 to 256-Z may be associated with a throughput rate among a range of throughput rates. For example, the maximum and minimum throughput rates in the range may be based on the network to which the network interface communicates (e.g., LAN, WAN, Frame Relay, or T1 network). For example, a lowest throughput rate for a LAN may be approximately four (4) megabit/s whereas a highest throughput rate for the LAN may be approximately ten (10) gigabit/s. For example, there may be a queue associated with the highest throughput rate and other queues to store packets to be transmitted at fifty percent (50%), twenty five percent (25%), or ten percent (10%) of the highest throughput rate. For example, there may be sixty-four (64) queues with effective throughput rates ranging from five (5) megabit/second to ten (10) gigabit/second. For example, multiple queues may be associated with the same or approximately the same throughput rate. For example, the device driver or other host software may determine throughput rates for each queue and issue timers for each queue, however other schemes may be used.

The throughput rate associated with each queue (including unmoderated queue 254) may be adjusted after initialization. For example, if any of queues 256-0 to 256-Z is full or overflowing, then multiple queues with for approximately the same throughput rate may be allocated. For example, if there is a high incidence of a particular range of throughput rates, then queues may be allocated among such range. For example, to adjust the throughput rate for a queue, the device driver or other host software may issue another timer for the queue using a descriptor, however other schemes may be used.

Arbiter 258 may request packets from any of queues 256-0 to 256-Z and unmoderated queue 254 based on expiration of timers. For example, at or following the expiration of each timer, arbiter 258 may request a packet from the queue associated with the expired timer and provide the packet to transceiver 260 for transmission to the network. In one embodiment, arbiter 258 may utilize timers 0 to Z associated with respective queues 256-0 to 256-Z. Each of timers 0 to Z may be set based on the throughput rate associated with each of respective queues 256-0 to 256-Z and depend on other factors such as packet size and protocol overhead amount. With respect to FIG. 3A, a timer may represent a byte-time between packets transmitted from the same queue. For example, a transmit instance may be measured at any of, but not limited to, (1) when a packet is released from a queue, (2) when a packet is provided to a transceiver, or (3) when the packet is indicated as transmitted to a network (whether or not actually transmitted to the network). The timer for each queue may be used to meter packets out to provide an implementation of inter-packet spacing. A timer for each queue may be set at initialization and may be subsequently changed.

In one embodiment, no timer may be used for unmoderated queue 254. Instead, arbiter 258 may request a packet from unmoderated queue 254 when any packet is available to be transmitted from unmoderated queue 254 and at the maximum rate allowed by the relevant protocol specification (e.g., NetBEUI or IPX/SPX).

In the event more than one packet is available to be requested at approximately the same time, arbiter 258 may employ an arbitration scheme to determine which packet should be transferred to transceiver 260 for transmission to the network. For example, any arbitration scheme may be used to decide which packet should be released from a queue first such as, but not limited to: round-robin, fair-weighted queuing, or prioritization. For example, under round-robin, priority is assigned to a queue based on its number among other queues with the priority rotating among the queues. For example, under fair-weighted queuing, priority is assigned to a queue so that priority to all queues achieves target percentages over time. For example, an unmoderated queue may have a target bandwidth percentage assigned whereas other queues may be assigned certain target bandwidth percentages. For example, under prioritization, priority is assigned to a queue based on any factors such as a preference to a throughput rate associated with a high priority connection partner or priority may be given to a queue with a lower throughput rate.

Transceiver 260 may include a media access controller (MAC) and a physical layer interface (PHY) (both not depicted) capable of receiving packets from a network and transmitting packets to a network in conformance with the applicable protocols such as Ethernet as described in IEEE 802.3 and related standards, although other protocols may be used. Transceiver 260 may receive and transmit packets from and to a network via a network medium. Transceiver 260 may forward packets received from a network to bus interface 250 for transfer to receive packet buffer 208 in the host system.

The embodiment of FIG. 3A may be implemented as any or a combination of: microchips or integrated circuits interconnected using a motherboard, hardwired logic, software stored by a memory device and executed by a microprocessor, firmware, an application specific integrated circuit (ASIC), and/or a field programmable gate array (FPGA).

Figure 3B:
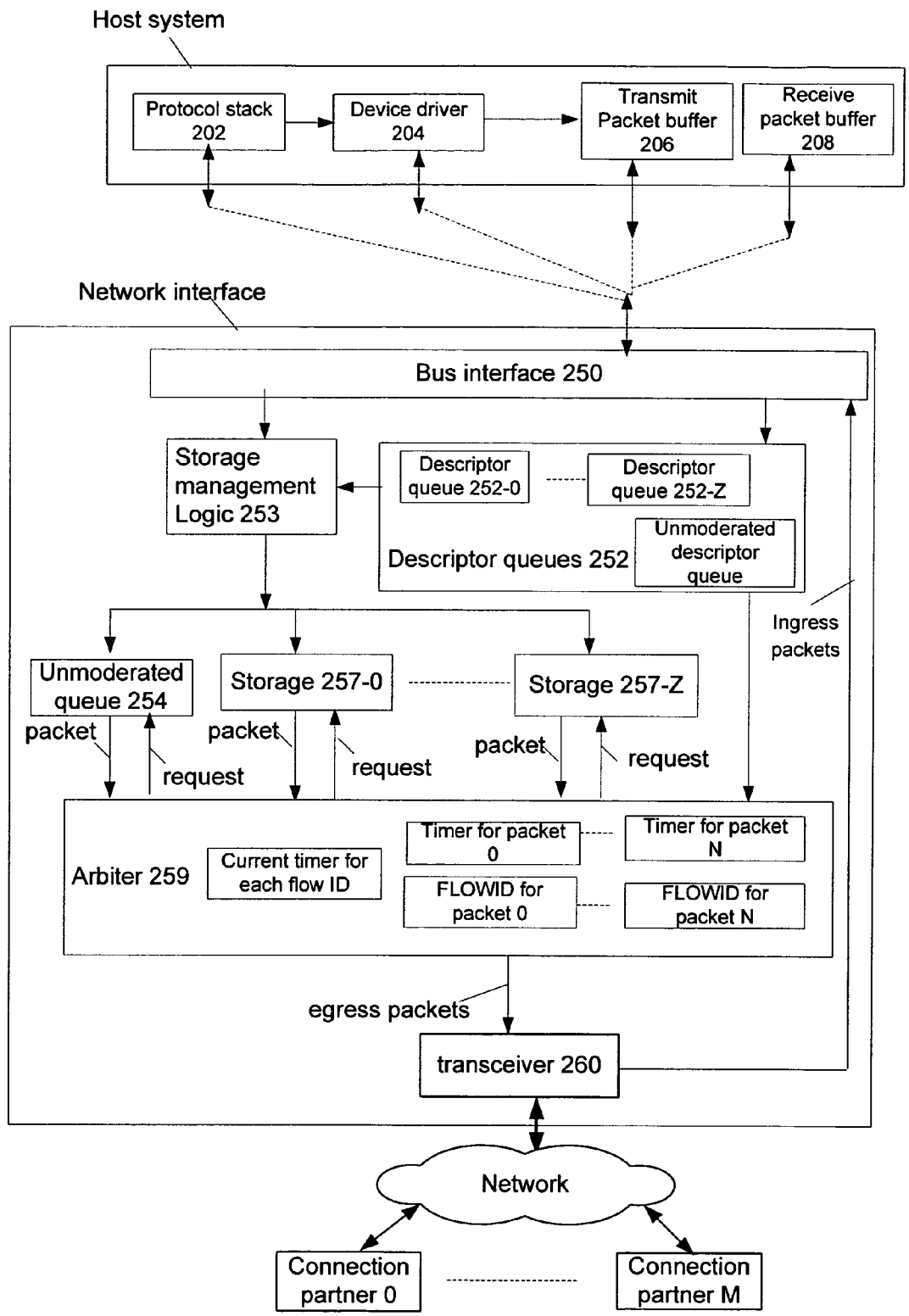

FIG. 3B depicts an example embodiment of the present invention that can be used to transmit packets at a variety of transmission speeds from a host computer to any of connection partners 0 to M (where $M \geq 1$) using a network interface. The host system represented in FIG. 3B may be similar to that described with respect to FIG. 3A except at least that for each packet, protocol stack 202 and/or device driver 204 may determine a timer, a flow identifier (ID), as well as which of the storages 257-0 to 257-Z and a location in storages 257-0 to 257-Z is to store the packet prior to transmission. A timer provided by stack or device driver for each packet may provide the inter-packet gap for packets in the same flow in terms of byte-times. A timer with respect to FIG. 3B may represent an amount of byte-time between (1) when the previous packet in the same flow was transmitted and (2) when the next packet in the same flow is to be transmitted. For example, a transmit instance may be measured at any of, but not limited to, (1) when a packet is released from a storage, (2) when a packet is provided to a transceiver, or (3) when the packet is indicated as transmitted to a network (whether or not actually transmitted to the network).

The network interface portion of FIG. 3B may include bus interface 250, descriptor queues 252, storage management logic 253, unmoderated queue 254, storages 257-0 to 257-Z, arbiter 259, and transceiver 260. An embodiment of bus interface 250 is described at least with respect to FIG. 3A.

Descriptor queues 252 can be used to transfer descriptors from the host system to the network interface. For example, each of storages 257-0 to 257-Z in the network interface has an associated descriptor queue among descriptor queue 252-0 to 252-Z so that when a packet is to be stored into a particular storage, the descriptor queue associated with the particular storage may transfer the descriptor. The descriptor for the packet may describe its location in transmit packet buffer, timer, flow ID, and location in a storage that is to store the packet. A descriptor queue may be allocated for use in transmitting descriptors that can be used for storage of packets into unmoderated queue 254. For example, packets that do not have an associated flow ID or timer may be transferred to unmoderated queue 254 using the allocated descriptor queue.

Storage management logic 253 may retrieve the location of a packet in a storage among storages 257-0 to 257-Z from a descriptor among descriptor queues 252-0 to 252-Z and place the packet into a specified location of the storage. Storage management logic 253 may also be capable of storing packets identified by a descriptor queue for unmoderated queue 254 into unmoderated queue 254.

Storages 257-0 to 257-Z may be capable of storing packets. Packets may be released from storages 257-0 to 257-Z in response to a request by arbiter 259. In some embodiments, packets from storages 257-0 to 257-Z may be released in a first-in-first-out order. For example, in some embodiments, storages 257-0 to 257-Z may be associated with a range of throughput rates. The range of throughput rates may be based on the maximum and minimum transmission rates to connection partners. For example, one of storages 257-0 to 257-Z may be associated with a maximum throughput rate within a range, another of storages 257-0 to 257-Z may be associated with a minimum throughput rate within a range, whereas other of storages 257-0 to 257-Z may be associated with a range of throughput rates evenly spaced between minimum and maximum throughput rates. Throughput rates may be set at initialization and adjusted thereafter.

Unmoderated queue 254 is at least described with respect to FIG. 3A. Packets in unmoderated queue 254 may be requested to be released in first-in-first-out order.

Arbiter 259 may retrieve the timer value, location and flow ID for each packet from an associated descriptor. Arbiter 259 may store a timer for multiple packets 0 to N (where $N \geq 1$) as well as the flow IDs for each of the packets 0 to N. Arbiter 259 may track the timer value for each flow ID (shown as "current timer for each flow ID" in FIG. 3B). For example, the current timer for each flow ID may be the timer associated with each packet stored earliest in time in any of storages 257-0 to 257-Z for each flow ID. In one embodiment, no timer may be used for unmoderated queue 254. Instead, arbiter 259 may request a packet from unmoderated queue 254 when any packet is available to be transmitted from unmoderated queue 254 and at the maximum rate allowed by the relevant protocol specification (e.g., NetBEUI and IPX/SPX). On or following the expiration of each timer, arbiter 259 may request the packet from the associated location in a specific storage (or from unmoderated queue 254 as described earlier) and provide the packet to transceiver 260 for transmission.

For example, on or following the expiration of each timer for a flow ID, arbiter 259 may thereafter set the current timer for the flow ID as the timer of the packet having the same flow ID and placed in any of storages 257-0 to 257-Z the next earliest in time. Count of byte-times may commence after a timer is loaded.

In the event that multiple packets are available to be requested at approximately the same time, arbiter 259 may employ an arbitration scheme to determine which packet should be transferred to transceiver 260 for transmission to the network. For example, any arbitration scheme may be used such as at least those described at least with respect to FIG. 3A. For example, in one arbitration scheme, arbiter 259 may use a flow ID to provide first-in-first-out transmission for the same connection.

An embodiment of transceiver 260 is described with respect to FIG. 3A.

Accordingly, in some embodiments, control frames may be permitted to bypass delayed or metered packets by assigning different flow IDs to control frames than metered packets and allowing control frames to have a higher throughput.

The embodiment of FIG. 3B may be implemented as any or a combination of: microchips or integrated circuits interconnected using a motherboard, hardwired logic, software stored by a memory device and executed by a microprocessor, firmware, an application specific integrated circuit (ASIC), and/or a field programmable gate array (FPGA).

Figure 3C:
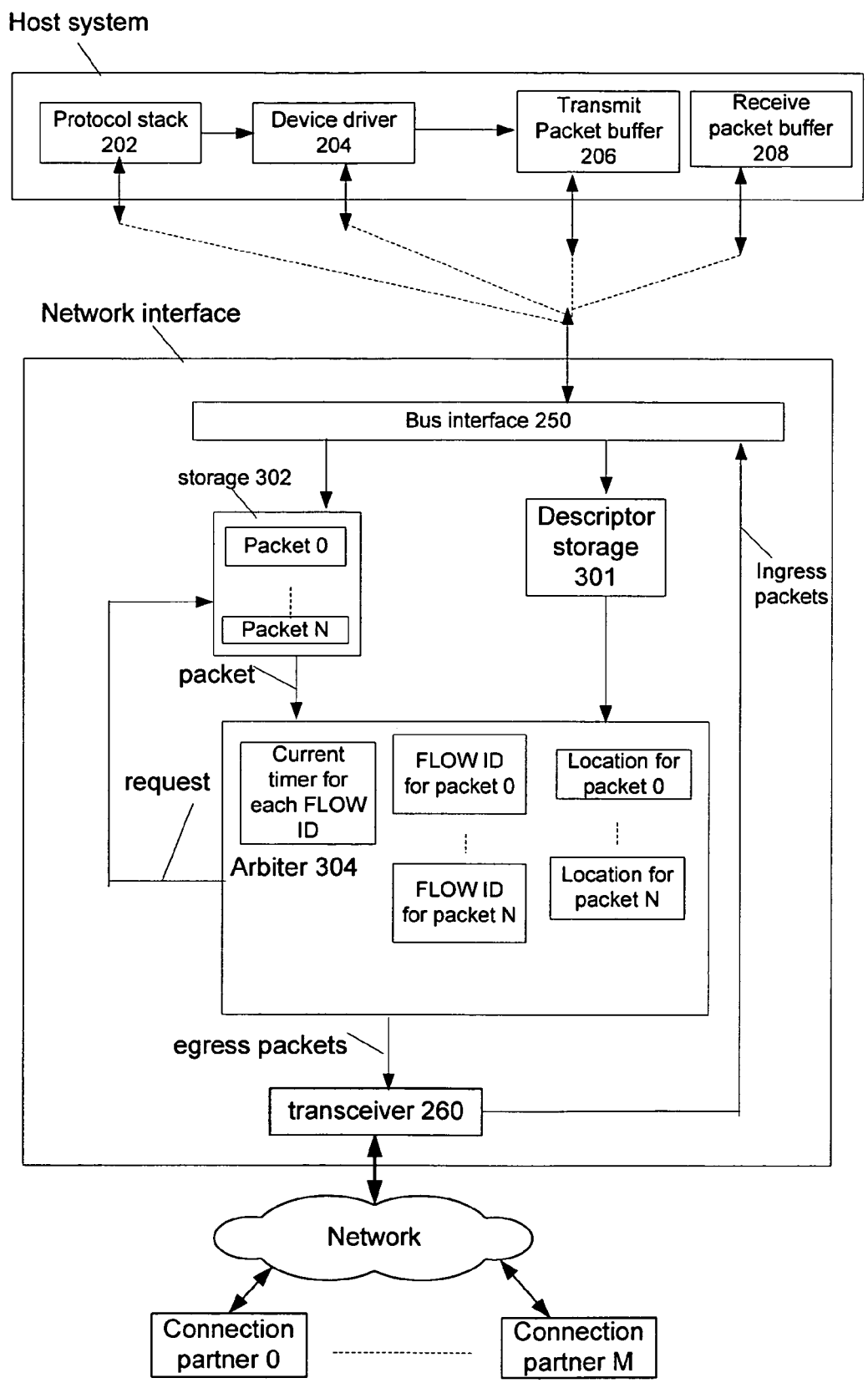

FIG. 3C depicts an example embodiment of the present invention that can be used to transmit packets at a variety of transmission speeds from a host computer to any of connection partners 0 to M (where $M \geq 1$) using a network interface. The host system represented in FIG. 3C may be similar to that described with respect to FIG. 3B except at least that in the host system, stack 202 or device driver 204 may determine a timer for each packet, a location in storage 302 to store a packet prior to transmission, and flow identifier (ID) for the packet.

The network interface portion of FIG. 3C may include bus interface 250, descriptor storage 301, storage 302, arbiter 304, and transceiver 260. An embodiment of bus interface 250 is described at least with respect to FIG. 3A.

Descriptor storage 301 can be used to transfer descriptors from the host system to the network interface. Descriptor storage 301 can be used to receive descriptors associated with each packet which specify at least a location of the packet in a transmit packet buffer, a timer for the packet, a location in storage 302 to store the packet prior to transmission, and flow ID for the packet.

Storage 302 may store packets 0 to N received from bus interface 250 to be transmitted to a network. Packets may be released from storage 302 in response to a request by arbiter 304 and not necessarily in a first-in-first-out order.

Arbiter 304 may store tags associated with each of the packets stored in storage 302. In one embodiment, tags associated with each of the packets stored in storage 302 may identify at least a timer for each packet, a location in storage 302 to store each packet prior to transmission, and flow ID for each packet. A timer with respect to FIG. 3C may represent an amount of byte-time between (1) when the previous packet in the same flow is transmitted and (2) when the next packet in the same flow is to be released from storage 302 for transmission. For example, a transmit instance may be measured at any of, but not limited to, (1) when a packet is released from storage 302, (2) when a packet is provided to a transceiver, or (3) when the packet is indicated as transmitted to a network (whether or not actually transmitted to the network). For example, in one implementation, tags may be stored in a control register of arbiter 304 such as a portion of addressable memory. For example, the current timer for each flow ID may be the timer associated with each packet stored earliest in time in storage 302 for each flow ID.

In one embodiment, arbiter 304 may request release of the packet from a specified location in storage 302 at or after expiration of a timer value. For example, on or following the expiration of each timer for a flow ID, arbiter 304 may thereafter set the current timer for the flow ID as the timer of the packet having the same flow ID and placed in storage 302 the next earliest in time. Count of byte-times may commence after a timer is loaded.

For packets that do not have specified timers or flow IDs, arbiter 304 may request each of such packets when any of such packets is available to be transmitted at the maximum rate allowed by the relevant protocol specification (e.g., NetBEUI and IPX/SPX).

If multiple packets are requested at approximately the same time, arbiter 304 may decide priority of which packet to retrieve from storage 302 based on numerous factors such as at least using the arbitration schemes described with respect to FIG. 3B.

An embodiment of transceiver 260 is described with respect to FIG. 3A.

The embodiment of FIG. 3C may be implemented as any or a combination of: microchips or integrated circuits interconnected using a motherboard, hardwired logic, software stored by a memory device and executed by a microprocessor, firmware, an application specific integrated circuit (ASIC), and/or a field programmable gate array (FPGA).

Figure 4:
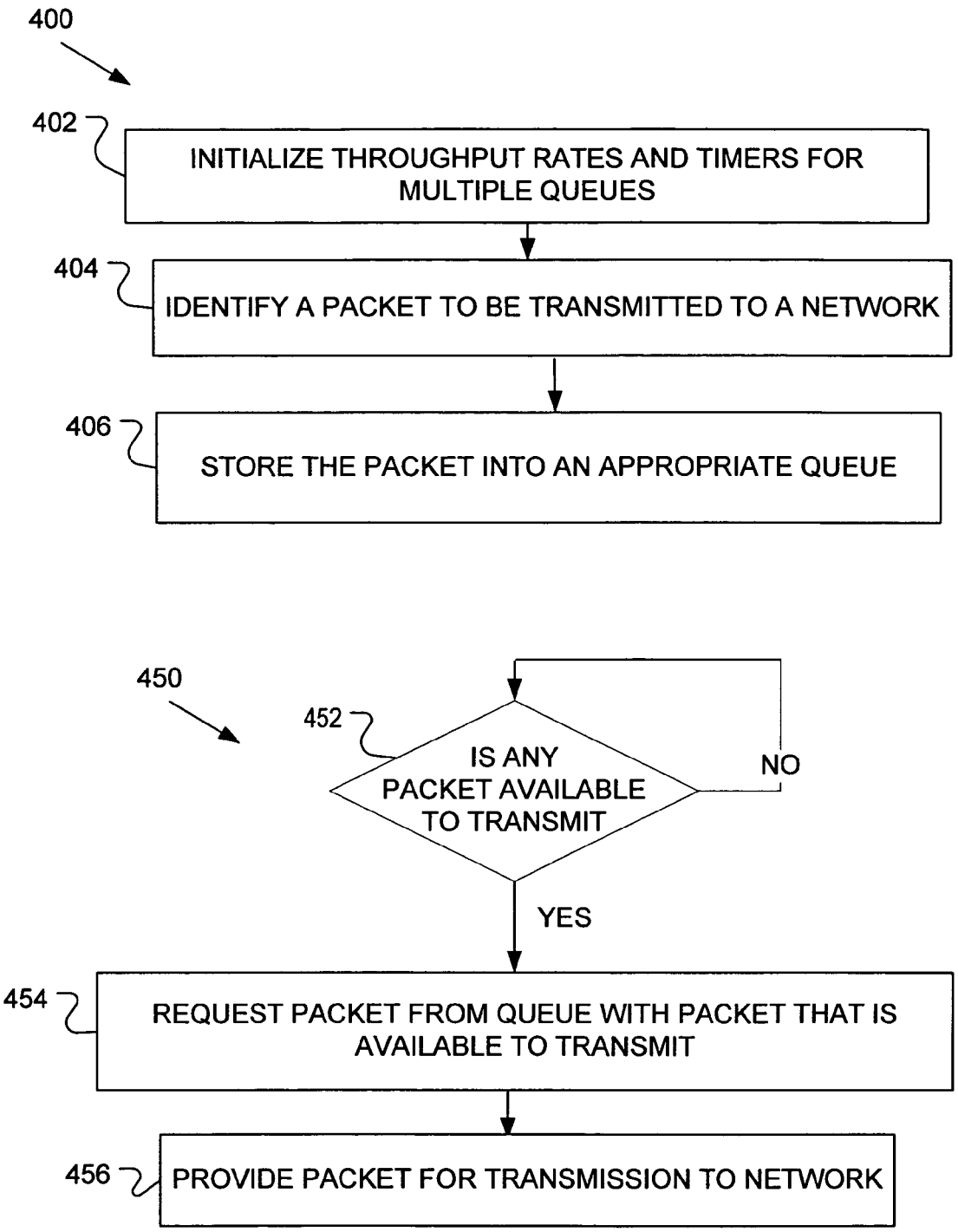
FIGS. 4-6 depict example flow diagrams in accordance with embodiments of the present invention.

FIG. 4 depicts example processes 400 and 450 that can be used in embodiments of the present invention to provide for transfer of packets to a network using queues which provide a variety of throughput rates as well as using an unmoderated queue. Process 400 may be used to store packets into appropriate queues in a network interface whereas process 450 may be used to request packets from queues for transmission to a network. For example, the processes 400 and 450 may be used by the system of FIG. 3A.

In block 402, process 400 may initialize throughput rates and timers for multiple queues. For example, queues may be provided in a memory device in a network interface. For example, a device driver (or protocol stack) for the network interface may initialize the throughput rate and timer for each of the queues. Queues may be capable of storing packets and releasing packets in a first-stored-first-released order. For example, a range of throughput rates may be associated with multiple queues so that for example one of the queues has a throughput range which is a maximum in the range, one of the queues has a throughput range which is a minimum in the range, and other queues have throughputs equally spaced between the range.

In block 404, process 400 may identify a packet to be transmitted. Some packets may be identified with an inter-packet spacing whereas some packets may have no specified inter-packet spacing. For example, a protocol stack or device driver in a host system may determine the inter-packet spacing for the packet. For example, the packet and associated inter-packet spacing (if applicable) may be transmitted from a host system to a network interface.

In block 406, process 400 may store the packet into an appropriate queue based at least on the associated inter-packet spacing. For example, a throughput rate may be associated with each inter-packet spacing so that the packet is stored into a queue having a throughput rate at or higher than that of the packet's associated inter-packet spacing. In one embodiment, if a packet has no associated inter-packet spacing, the packet may be stored into the unmoderated queue.

In block 452, process 450 may determine whether any packet is available to transmit. For example, for packets stored in the unmoderated queue, a packet is available to transmit when any packet is stored in the unmoderated queue. For example, for other queues, a packet is available to transmit when a timer associated with a queue has expired. If no packet is available to transmit, block 452 repeats. If any packet is available to transmit, block 454 follows block 452.

In block 454, process 450 may request a packet from the queue associated with a packet that is ready to transmit. In one embodiment, the queue with the expired timer may provide packets in a first-in-first-out order. In the event that multiple packets are available to transmit at or about the same time, process 450 may employ an arbitration scheme to determine from which queue a packet should be retrieved first for transmission to the network. For example, any arbitration scheme may be used such as, but not limited to: round-robin, fair-weighted queuing, or prioritization.

In block 456, process 450 may provide the packet retrieved from the queue for transmission to a network. For example, process 450 may provide the packet to a transceiver in a network interface for transmission to a network.

Figure 5:
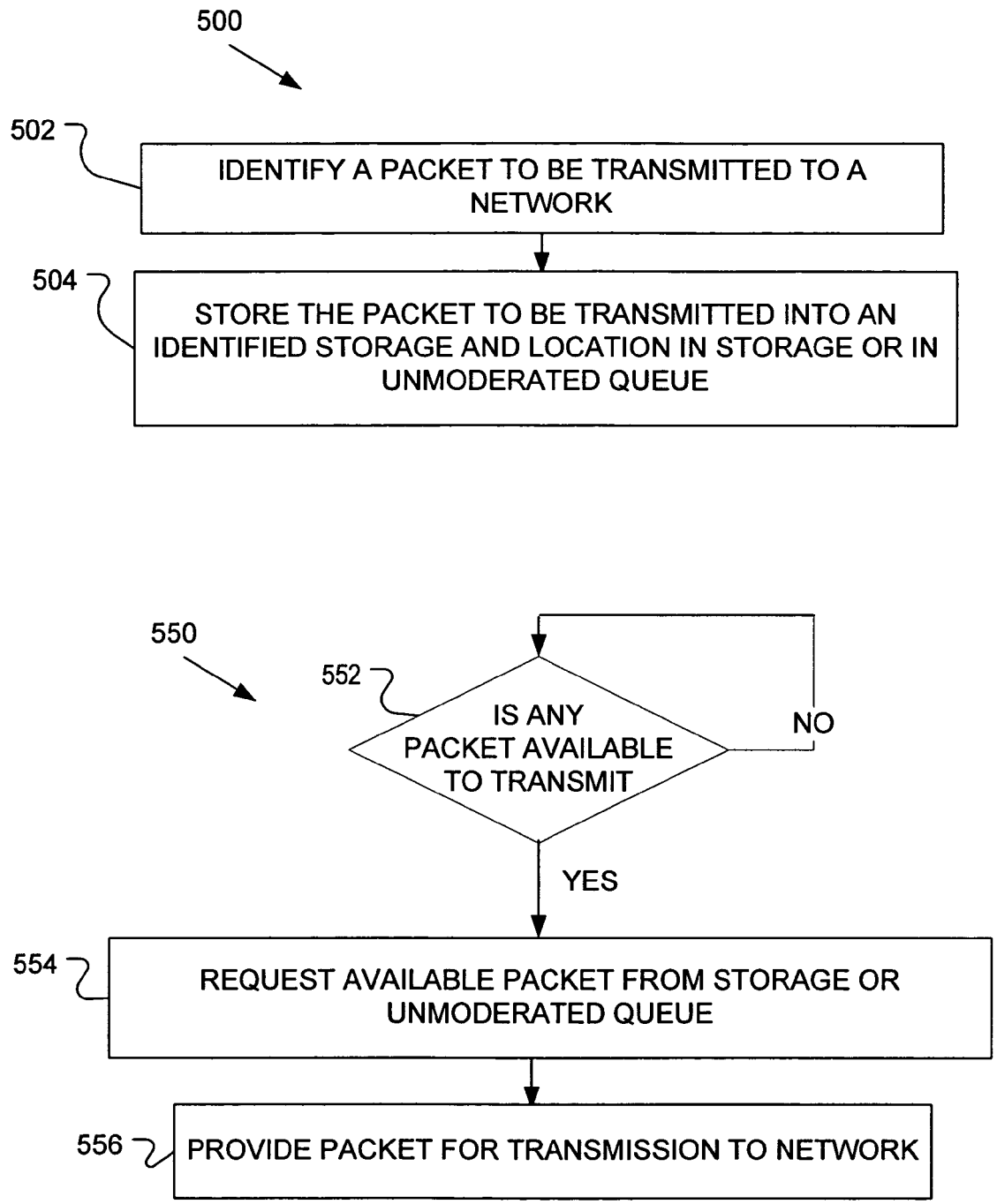

FIG. 5 depicts example processes 500 and 550 that can be used in embodiments of the present invention to provide for transfer of packets to a network using storages as well as using an unmoderated queue. Process 500 may be used to store packets into appropriate storages (or the unmoderated queue) in a network interface whereas process 550 may be used to request packets from storages (or the unmoderated queue) for transmission to a network. For example, the processes 500 and 550 may be used by the system of FIG. 3B.

In block 502, process 500 may identify a packet that is to be transmitted to a network. For example, for some packets, process 500 may provide a timer, storage, flow identifier (ID), and location in the storage for the packets whereas some packets may have no specified timer or flow ID. A timer may represent an amount of byte-time between (1) when the previous packet in the same flow was transmitted and (2) when the next packet in the same flow is to be transmitted. For example, a device driver or protocol stack may provide the timer, flow ID, storage, and location in a storage for the packet in a descriptor. In one embodiment, each of the storages and the unmoderated queue may have an associated descriptor storage so that when a packet is to be stored into a storage, the descriptor storage associated with the storage that is to store the packet may be used to transfer the descriptor.

In block 504, process 500 may store the packet to be transmitted into an identified storage and location in storage or in the unmoderated queue. For example, packets with no associated timer or flow ID may be stored in the unmoderated queue.

Referring to process 550, in block 552, process 550 may determine whether any packet is available to transmit. For example, for packets stored in the unmoderated queue, a packet is available to transmit when any packet is stored in the unmoderated queue. For example, for storages, a packet is available to transmit when a timer associated with any queue has expired. If no packet is available to transmit, block 552 repeats. If any packet is available to transmit, block 554 follows block 552.

In block 554, process 550 may request a packet that is available to transmit from a location in a storage or the unmoderated queue. In the event that multiple packets are available to transmit at or about the same time, process 550 may employ an arbitration scheme to determine from which queue a packet should be retrieved first for transmission to the network. For example, any arbitration scheme may be used such as, but not limited to any arbitration schemes described with respect to FIG. 3B.

In block 556, process 550 may provide the packet retrieved from the storage for transmission to a network. For example, process 550 may provide the packet to a transceiver in a network interface for transmission to a network.

Figure 6:
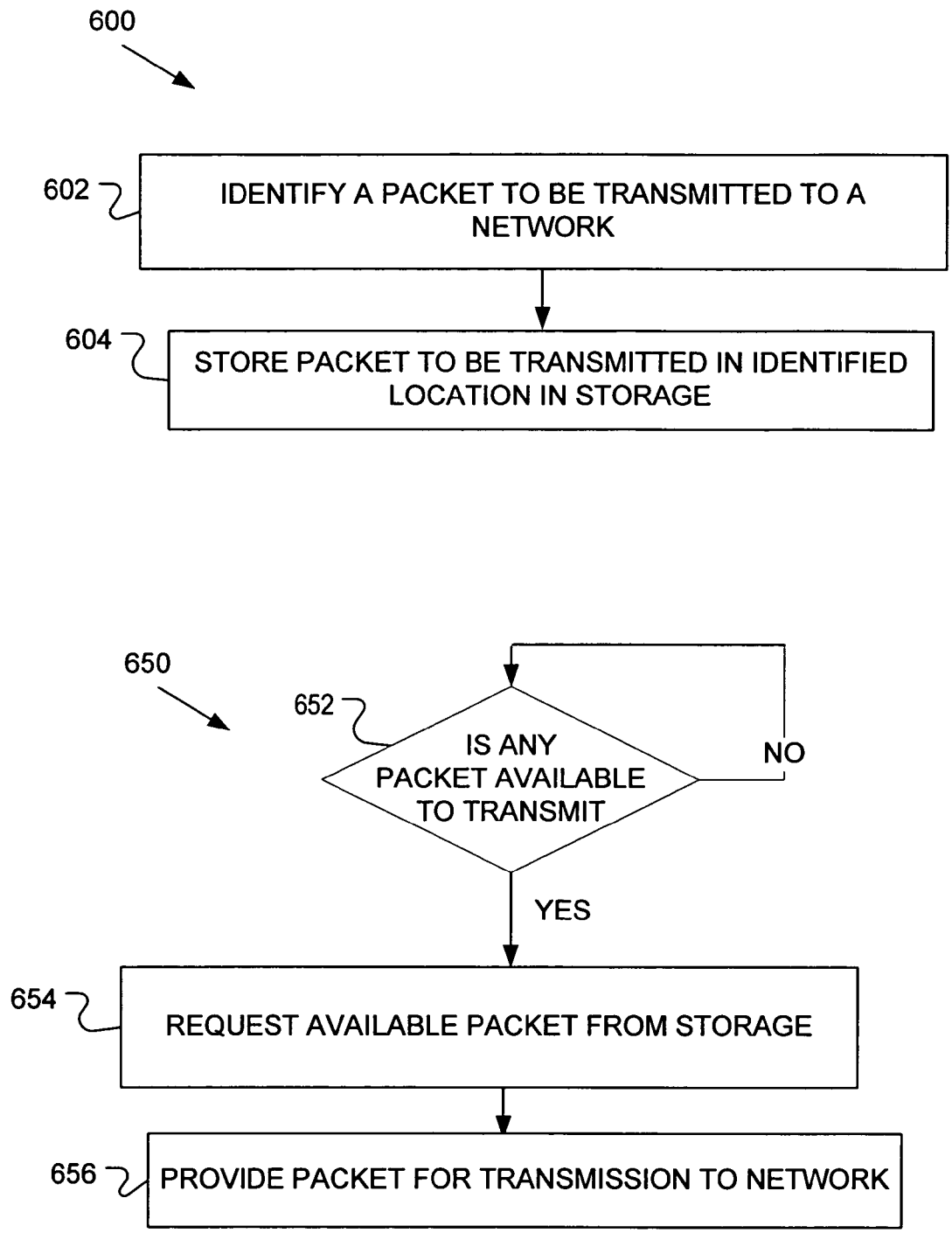

FIG. 6 depicts example processes 600 and 650 that can be used in embodiments of the present invention to provide for transfer of packets to a network using a storage which can support a variety of throughput rates. Process 600 may be used to store packets into specified locations in the storage in a network interface whereas process 650 may be used to request packets from the storage for transmission to a network. For example, the processes 600 and 650 may be used by the system of FIG. 3C.

In block 602, process 600 may identify a packet that is to be transmitted to a network. For example, for some packets, process 500 may provide a packet to be transmitted to a connection partner along with its location in the storage, timer, and flow identifier (ID) whereas some packets may have no specified timer or flow ID. A timer may represent an amount of byte-time between (1) when the previous packet in the same flow was transmitted and (2) when the next packet in the same flow is to be transmitted. For example, a device driver or protocol stack may provide the location in the storage, timer, and flow identifier (ID).

In block 604, process 600 may store a packet to be transmitted in an identified location in the storage. In one embodiment, a single storage may be used to store packets having different throughput rates.

Referring to process 650, in block 652, process 650 may determine whether any packet is available to transmit. For example, a packet is available to transmit when a timer associated a flow ID associated with the packet has expired or in the case of packets with no flow ID or timer, when any such packet is stored in the storage. If no packet is available to transmit, block 652 repeats. If any packet is available to transmit, block 654 follows block 652.

In block 654, process 650 may request an available packet from storage. In the event that multiple packets are available to transmit at or about the same time, process 650 may employ an arbitration scheme which packet should be retrieved first for transmission to the network. For example, any arbitration scheme may be used such as, but not limited to: any arbitration schemes described with respect to FIG. 3B.

In block 656, process 650 may provide the packet retrieved from the storage for transmission to a network. For example, process 650 may provide the packet to a transceiver in a network interface for transmission to a network.

In block 656, process 650 may provide the packet retrieved from the storage for transmission to a network. For example, process 650 may provide the packet to a transceiver in a network interface for transmission to a network.

In some embodiments, customers that lease Internet connections (such as for web hosting) may be charged one of two ways: (1) a fixed rate (e.g., for dedicated bandwidth availability) or (2) pay-per-bandwidth. In case (1), the website or other use has a dedicated link and the lessee pays a fixed monthly bill amount. Embodiments of the present invention can provide support for case (1) because some embodiments reduce lost packets on the Internet and increases effective throughput rates.

Embodiments of the present invention can be used to support case (2). In case (2), billing may be based on how much data is transmitted. Hosting companies often over-subscribe or over-sell their bandwidth. For example, some embodiments reduce the number of data retransmissions that may be utilized. For example, transmitted bytes are generally counted at layer 2 (Ethernet) so TCP (layer 4) re-transmissions can mean that the lessee pays for the data twice (or more) even though it was only received once. Because lessees pay for some retransmitted data, costs can be reduced by reducing retransmissions. Another way that some embodiments support case (2) is that embodiments adapt the flow rate based on the bandwidth available in a shared media (e.g., a switched network local area network or a shared T1, T3, or OC-192 Internet link).

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:

storing a first packet in at least one storage device of a plurality of storage devices prior to transmission to a network;

requesting a packet from a storage device among the at least one storage in response to availability of the packet;

providing the requested packet for transmission to the network;

receiving a descriptor that describes an inter-packet spacing of the first packet and wherein the inter-packet spacing is to be determined based on a receiver window size that is to indicate how much data a recipient link partner is accepting at a time the first packet was generated, wherein the storage device is to be associated with the inter-packet spacing of the first packet;

associating a descriptor queue with each storage device of the plurality of storage devices; and receiving a descriptor that describes at least a location in a storage device in which to store the first packet and a timer for the first packet from a descriptor queue associated with the storage device in which to store the first packet, wherein the storing comprises storing the first packet in the storage and location associated with the first packet.

2. The method of claim 1, wherein a timer is associated with each storage device and wherein the requesting comprises requesting the packet from the storage device associated with the expired timer.

3. The method of claim 1, wherein a timer is associated with each flow identifier and wherein the requesting comprises requesting the packet from a storage device and storage location associated with the expired timer.

4. The method of claim 1, wherein at least one storage device includes an unmoderated queue, wherein the storing comprises storing the first packet into the unmoderated queue in part in response to the first packet having no associated throughput or flow identifier, and wherein the requesting comprises requesting the first packet from the unmoderated queue in response to availability of any packet in the unmoderated queue.

5. The method of claim 1, wherein the requesting a packet from a storage device comprises applying an arbitration scheme in response to availability of more than one packet.

6. A computer-readable medium comprising instructions stored thereon which when executed by a machine cause the machine to:

store a first packet in at least one storage device of a plurality of storage devices prior to transmission to a network;

request a packet from a storage device among the at least one storage in response to availability of the packet;

provide the requested packet for transmission to the network;

receive a descriptor that describes an inter-packet spacing of the first packet and wherein the inter-packet spacing is to be determined based on a receiver window size that is to indicate how much data a recipient link partner is accepting at a time the first packet was generated, wherein the storage device is to be associated with the inter-packet spacing of the first packet;

associate a descriptor queue with each storage device of the plurality of storage devices; and receive a descriptor that describes at least a location in a storage device in which to store the first packet and a timer for the first packet from a descriptor queue associated with the storage device in which to store the first packet, wherein the storing comprises storing the first packet in the storage and location associated with the first packet.

7. The computer-readable medium of claim 6, wherein a timer is associated with each storage device and wherein the instruction to request comprises an instruction to request the packet from the storage device associated with the expired timer.

8. The computer-readable medium of claim 6, wherein a timer is associated with each flow identifier and wherein the instruction to request comprises an instruction to request the packet from a storage device and storage location associated with the expired timer.

9. The computer-readable medium of claim 6, wherein at least one storage device includes an unmoderated queue, wherein the instruction to store comprises an instruction to store the first packet into the unmoderated queue in part in response to the first packet having no associated throughput or flow identifier, and wherein the instruction to request comprises an instruction to request the packet from the unmoderated queue in response to availability of any packet in the unmoderated queue.

10. The computer-readable medium of claim 6, wherein the instruction to request a packet from a storage device comprises an instruction to apply an arbitration scheme in response to availability of more than one packet.

11. An apparatus comprising:

at least one storage device of a plurality of storage devices, wherein each storage device is to store packets prior to transmission to a network;

queue management logic to determine which storage device is to store a first packet;

an arbiter to request a packet from a storage device among the at least one storage device in response to availability of the packet, wherein the queue management logic is to receive a descriptor that describes an inter-packet spacing of the first packet and wherein the inter-packet spacing is to be determined based on a receiver window size that is to indicate how much data a recipient link partner is accepting at a time the first packet was generated, wherein the storage device is to be associated with the inter-packet spacing of the first packet, a descriptor queue is to be associated with each storage device of the plurality of storage devices, and a descriptor is to describe at least a location in a storage device in which to store the first packet and a timer for the first packet from a descriptor queue associated with the storage device in which to store the first packet, wherein the storing comprises storing the first packet in the storage and location associated with the first packet.

12. The apparatus of claim 11, wherein a timer is associated with each storage device and wherein the arbiter is to request the packet from the storage device associated with the expired timer.

13. The apparatus of claim 11, wherein a timer is associated with a flow identifier and wherein the arbiter is to request the packet from a storage device and storage location associated with the expired timer.

14. The apparatus of claim 11, wherein one storage device includes an unmoderated queue, wherein the queue management logic is to store the first packet in the unmoderated queue in part in response to the first packet having no associated inter-packet gap or flow identifier, and wherein the arbiter is to request a packet from the unmoderated queue in response to availability of any packet in the unmoderated queue.

15. The apparatus of claim 11, wherein the arbiter is to apply an arbitration scheme in response to availability of more than one packet.

16. A system comprising:

a host system comprising a processor and a memory device;

a parallel bus; and a chipset to communicatively couple the host system to the bus, wherein the chipset comprises a network interface and wherein the network interface comprises:

at least one storage device of a plurality of storage devices, wherein each storage device is to store packets prior to transmission to a network;

queue management logic to determine which storage device is to store a first packet;

an arbiter to request a packet from a storage device among the at least one storage device in response to availability of the packet, wherein the queue management logic is to receive a descriptor that describes an inter-packet spacing of the first packet and wherein the inter-packet spacing is to be determined based on a receiver window size that is to indicate how much data a recipient link partner is accepting at a time the first packet was generated, wherein the storage device is to be associated with the inter-packet spacing of the first packet, a descriptor queue is to be associated with each storage device of the plurality of storage devices, and a descriptor is to describe at least a location in a storage device in which to store the first packet and a timer for the first packet from a descriptor queue associated with the storage device in which to store the first packet, wherein the storing comprises storing the first packet in the storage and location associated with the first packet.

17. The system of claim 16, wherein the bus is compatible with PCI.

18. The system of claim 16, wherein the bus is compatible with PCI express.

19. The system of claim 16, further comprising a switch capable of receiving packets from the network interface and transferring packets to one or more link partners.

20. The method of claim 1, wherein the inter-packet spacing is to be determined based on one or more of: (1) a congestion window that limits an amount of data that is sent at any time; (2) an acknowledgement in a packet header received from the recipient link partner; (3) a pattern of acknowledgement indicative of packet loss by the recipient link partner; and (4) a round-trip time of an acknowledgement.

21. The computer-readable medium of claim 6, wherein the inter-packet spacing is to be determined based on one or more of: (1) a congestion window that limits an amount of data that is sent at any time; (2) an acknowledgement in a packet header received from the recipient link partner; (3) a pattern of acknowledgement indicative of packet loss by the recipient link partner; and (4) a round-trip time of an acknowledgement.

22. The apparatus of claim 11, wherein the inter-packet spacing is to be determined based on one or more of: (1) a congestion window that limits an amount of data that is sent at any time; (2) an acknowledgement in a packet header received from the recipient link partner; (3) a pattern of acknowledgement indicative of packet loss by the recipient link partner; and (4) a round-trip time of an acknowledgement.

23. The system of claim 16, wherein the inter-packet spacing is to be determined based on one or more of: (1) a congestion window that limits an amount of data that is sent at any time; (2) an acknowledgement in a packet header received from the recipient link partner; (3) a pattern of acknowledgement indicative of packet loss by the recipient link partner; and (4) a round-trip time of an acknowledgement.

* * * * *